United States Patent
Berg et al.

(10) Patent No.: US 6,349,535 B1
(45) Date of Patent: Feb. 26, 2002

(54) PROCESS AND APPARATUS FOR TWO-STAGE SUPERCHARGING OF PROCESS AIR FOR A FUEL CELL

(75) Inventors: Falko Berg; Robert Geiser, both of Berlin; Michael Kising, Gross-Machnow; Viktor Pfeffeer, Ostfilden; Goetz von Esebeck, Mahlow; Friedrich Wirbeleit, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/456,561

(22) Filed: Dec. 8, 1999

(30) Foreign Application Priority Data

Dec. 8, 1998 (DE) .......................... 198 56 499

(51) Int. Cl.[7] .............................. F02C 3/00; F02G 3/00
(52) U.S. Cl. .......................................... 60/39.02; 60/723
(58) Field of Search ........................ 60/39.02, 39.05, 60/39.06, 39.12, 723

(56) References Cited

U.S. PATENT DOCUMENTS

| | | | |
|---|---|---|---|
| 4,135,361 A | * 1/1979 | Eisenhaure | ............. 60/39.02 |
| 4,595,642 A | 6/1986 | Nakanishi et al. | ............. 429/19 |
| 4,759,997 A | 7/1988 | Ohyauchi et al. | ............. 429/19 |
| 4,838,020 A | 6/1989 | Fujitsuka | |
| 5,177,952 A | * 1/1993 | Stone | ............. 60/39.05 |
| 5,417,051 A | * 5/1995 | Ankersmit et al. | ........ 60/39.02 |

FOREIGN PATENT DOCUMENTS

| | | |
|---|---|---|
| DE | 42 01 795 | 7/1993 |
| DE | 43 18 818 A1 | 7/1993 |
| DE | 197 55 116 C1 | 11/1997 |
| DE | 1975116 C1 * | 4/1999 |
| JP | 51-104540 | 9/1976 |
| JP | 60-208061 | 10/1985 |
| JP | 63-281363 | 11/1988 |
| JP | 7-14599 | 1/1995 |
| JP | 7-105963 | 4/1995 |
| WO | WO 97/20134 | 6/1997 |

* cited by examiner

*Primary Examiner*—Charles G. Freay
*Assistant Examiner*—W. Rodriguez
(74) *Attorney, Agent, or Firm*—Crowell & Moring LLP

(57) ABSTRACT

In a process and apparatus for two-stage supercharging of process air for a fuel cell, in one of the two charging stages, supercharging taking place by means of a displacement machine. In the other charging stage, supercharging is performed by means of a combined expansion and compression machine. Energy is recovered from the exhaust gas of a fuel cell by means of the combined expansion and compression machine.

4 Claims, 1 Drawing Sheet

PROCESS AND APPARATUS FOR TWO-STAGE SUPERCHARGING OF PROCESS AIR FOR A FUEL CELL

BACKGROUND AND SUMMARY OF THE INVENTION

This application claims the priority of German patent document 198 56 499.6, filed Dec. 12, 1998, the disclosure of which is expressly incorporated by reference herein.

The invention relates to a process and apparatus for two-stage supercharging of process air for a fuel cell.

German Patent Document DE 43 18 818 A1 discloses a fuel cell system in which the process air is compressed by means of a compressor. For the recovery of energy, the fuel cell exhaust gas is fed to an expander which is coupled with the compressor by a shaft. The compressor and expander operate according to the displacement principle, and are constructed particularly as rotary machines. This system has the disadvantage that it is not suitable for fuel cell systems in which the fuel gas must first be generated by reforming methanol. In the case of fuel cell systems of this type, the exhaust gas temperature typically amounts to 350° C. These temperatures are compatible with a displacement machine only to a limited extent.

U.S. Pat. No. 4,838,020 discloses a fuel cell system in which the process air is supercharged by means of an exhaust gas turbocharger. The process air to be fed to the fuel cell is compressed by means of a compressor. To recover energy from the fuel cell exhaust gas, the exhaust gas is guided to a turbine which is mechanically coupled with the compressor. In addition, a catalytic burner, which raises the energy content of the exhaust gas guided to the turbine, is arranged in the exhaust gas pipe.

In German patent document DE 197 55 116.5 (which is not prior art), a fuel cell system with a two-stage supercharging operation is described. An expansion machine is used in both stages. In this case, the turbine of the first stage is operated with the exhaust gas of the fuel cell. A catalytic burner, which raises the energy content of the exhaust gas guided to the turbine, is also arranged in the exhaust pipe. The turbine of the second stage is operated by the expansion of the highly pressurized gas from the high-pressure generating unit of the fuel cell system.

It is an object of the invention to provide a process and apparatus for two-stage supercharging of process air for a fuel cell which achieve a high pressure ratio, as well as a high efficiency.

This and other objects and advantages are achieved by the process and apparatus according to the invention, in which fuel cell process air is supercharged in two charging stages: by means of a displacement machine in one charging stage, and by means of a combined expansion and compression machine in the other charging stage. In this manner, the expansion of the fuel cell exhaust gas is used to compress the charge air, so that energy from the exhaust gas can be recovered.

In a multi-stage supercharging, a total pressure ratio $\pi_{total}$ is obtained as the product of the pressure ratios $\pi 1$, $\pi 2$ of the two compressor stages:

$$\pi_{total} = \pi_1 * \pi_2.$$

A displacement machine is a compressor which takes in the conveying medium (gas or gas mixture) by the enlargement of working space (for example, cylinder), and displaces it by a subsequent reduction of the working space. As the result of this movement, the pressure of the conveying medium is increased. The main structural element of the displacement machine is a piston. Depending on the type of movement of this piston, a distinction is therefore made between reciprocating piston machines or rotary piston machines. Depending on whether the conveying medium is compressed inside or outside the machine, a differentiation is made between machines with and without an internal compression. Displacement machines are also called mechanical chargers because they compress the conveying medium by using mechanical energy.

In a combined expansion and compression machine, speed energy in a continuous gas flow is converted into pressure energy. It operates at high rotational speeds and high temperatures. According to the invention, particularly an exhaust gas turbocharger or a compression wave charger (also called Comprex® in literature) are used.

ADVANTAGES OF THE INVENTION

A high pressure ratio is achieved, without need of a high-pressure gas generating system as in German patent document DE 197 55 116.5.

Energy can be recovered from the exhaust gas of the fuel cell.

A high efficiency is achieved.

The invention can also be used at high exhaust gas temperatures, and is therefore particularly suitable for use in methanol fuel cell systems, in which the fuel gas is generated by the reforming of methanol.

In contrast to one-stage supercharging by means of an exhaust gas turbocharger, a higher flexibility is achieved with respect to the space distribution of the individual components.

The system can be implemented entirely without oil. This is of great significance in the case of a fuel cell system because the fuel cell is destroyed or limited in its efficiency by the oil.

The invention can be used for all types of fuel cell systems. It is particularly suitable for mobile applications, for example, in a motor vehicle or in railway systems.

Other objects, advantages and novel features of the present invention will become apparent from the following detailed description of the invention when considered in conjunction with the accompanying drawings.

DETAILED DESCRIPTION OF THE DRAWINGS

Figure 1:
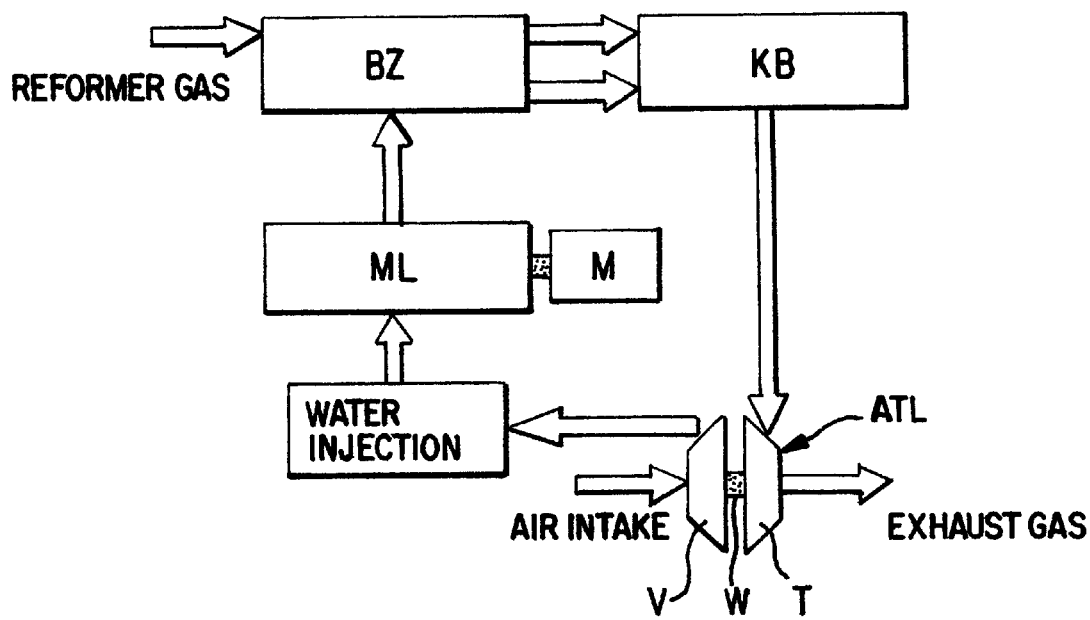
FIG. 1 is a view of a first embodiment of the invention, with an exhaust gas turbocharger in a first charging stage.

FIG. 1 illustrates a first embodiment of the invention, including a fuel cell system in which the fuel gas ($H_2$) obtained from the reforming of methanol is introduced on the anode side of the fuel cell BZ. In an alternative embodiment, the fuel gas can also be supplied to the fuel cell from a storage container carried aboard a vehicle.

The process air supplied on the cathode side of the fuel cell BZ is supercharged in two stages. In the first stage, an exhaust gas turbocharger ATL is used for precompression of the charge air (boost stage). The exhaust gas turbocharger ATL may be a conventional turbocharger, such as is frequently used in internal-combustion engines. It comprises a turbine T as well as a compressor V arranged on a common shaft W. The geometry of the turbine T can be variable corresponding to the given application. The exhaust gas of the fuel cell BZ is expanded at the turbine T. The energy which is recovered in this manner is supplied by way of the shaft W directly to the compressor V of the turbocharger ALT.

The second charging stage utilizes a mechanical charger ML, such as a rotary compressor, which is driven by an electric motor M. Since the exhaust gas turbocharger ATL builds up the preliminary pressure as a function of the exhaust gas flow rate (and thus of the rotational speed), in the lower load range, the final pressure may be too low while, in the upper range, it may be higher than required. This can be counteracted by a waste gate control in that a pressure control valve is provided. By means of the pressure control valve or waste gate, which is arranged behind the mechanical charger ML, the pressure is limited in the upward direction; that is, although the charge air is compressed higher by the mechanical charger, the supplied excess pressure is "blown off". The supplied excess air is fed directly to the expansion machine of the turbocharger ATL.

The compressed process air is introduced on the cathode side into the fuel cell BZ, which may be constructed, for example, as a PEM fuel cell (Proton Exchange Membrane).

Between the first and the second charging stage, a water injection humidifies the charge air, as is usually provided in PEM fuel cells. After leaving the fuel cell BZ, the anode exhaust gas and/or the cathode exhaust gas is guided into a catalytic burner KB. The catalytic burner KB is used as the heat source of the fuel cell system. When it leaves the catalytic burner KB, the exhaust gas (which has a temperature of approximately 350° C.) is guided to the turbine T. This process implementation has the advantage that a significantly higher mass flow is supplied to the turbine T, which mass flow also has a higher temperature.

In another embodiment (not shown), the exhaust gas of the fuel cell (anode exhaust gas and/or cathode exhaust gas) can be guided directly to the turbine of the turbocharger also without the intermediate connection of the catalytic burner.

It is also pointed out that, as an alternative to the illustrated embodiment, the mechanical charger ML can also be used in the first stage, while the combined expansion and compression machine ATL forms the second charging stage.

Figure 2:
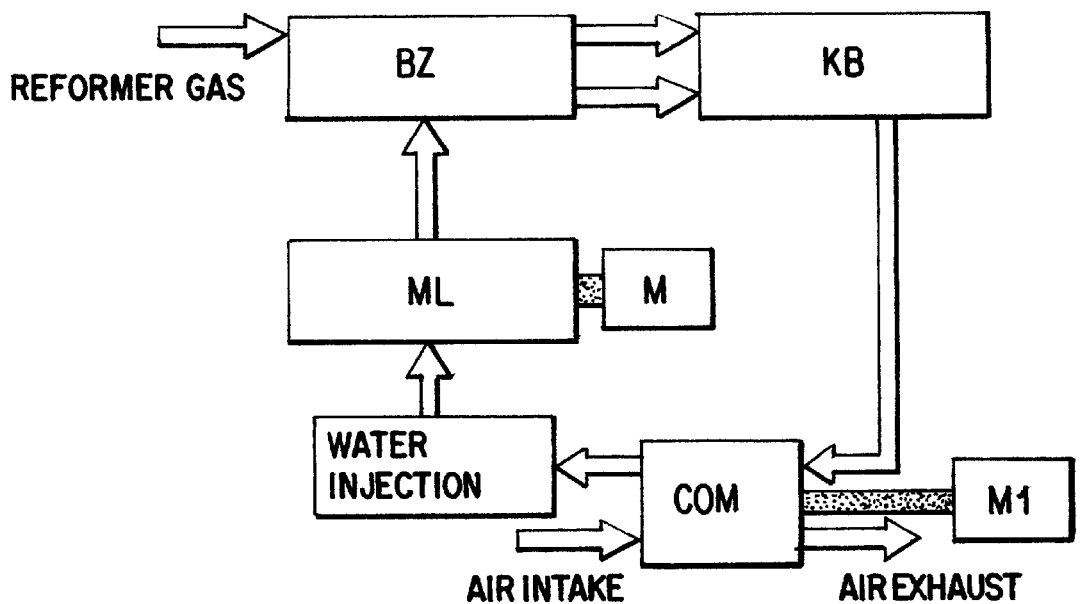
FIG. 2 is a view of a second embodiment, with a Comprex compressor in the first charging stage.

FIG. 2 illustrates another embodiment of the invention., which differs from the embodiment of FIG. 1 only in that, instead of the exhaust gas turbocharger, a compression wave charger COM is used. This may be a conventional compression wave charger, such as is frequently used in internal-combustion engines. In a compression wave charger—as in an exhaust gas turbocharger, but according to a completely different principle the energy of the exhaust gases is used to compress the charge air. The method of operation of a compression wave charger is based on the fact that a compression wave travelling through a line is reflected negatively at one end, that is, as a vacuum wave, but is reflected at a closed end as a compression wave. Inversely, a suction wave at the open end is reflected as a compression wave and, at the closed end, is reflected as a suction wave. The compression wave charger, whose construction is well known, and hence not shown in detail in FIG. 2, consists of a rotary blade having ducts of a trapezoidal cross-section which are open on the face and are arranged on the circumference. The rotary blade is disposed in a housing and is enclosed by a jacket in a no-contact manner. It is driven by the motor M1. However, the driving power is low (approximately 300 to 400 watts); only bearing and ventilation losses must be overcome.

As in the embodiment illustrated in FIG. 1, a waste gate control may exist in that a pressure control valve or the waste gate is arranged behind the mechanical charger ML. The delivered excess air is fed directly to the compression wave charger COM.

Relative to the embodiment of FIG. 1, the embodiment illustrated in FIG. 2 has the advantage that the behavior of the two chargers can be much better adapted to one another.

In an advantageous further development, the rotor of the compression wave charger COM can be provided with so-called registers, as described for example in International Patent Document WO 97/20134. In this case, the rotor surface is divided according to a defined ratio into the individual registers, for example, at 1/3 and 2/3, in order to be able to implement three switching positions as a function of the mass flow. As the result, the control range of the compression wave charger is correspondingly tripled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A two-stage supercharging apparatus for charging process air for a fuel cell, comprising:

a displacement machine in one of the two stages;

a combined expansion and compression machine in the other stage; and means for recovering energy from exhaust gas of the fuel cell.

2. A supercharging apparatus for charging process air into a fuel cell, comprising:

one charging stage comprising a displacement machine;

another charging stage comprising a combined expansion and compression machine, said charging stages being coupled sequentially in fluid flow communication for providing charged process air to said fuel cell; and means for recovering energy from an exhaust gas from said fuel cell, and for supplying said energy to drive said combined expansion and compression machine.

3. Apparatus according to claim 2, wherein said means for recovering energy comprises means for expanding said exhaust gas from said fuel cell through a turbine which drives said combined expansion and compression machine.

4. Apparatus according to claim 2, wherein said other charging stage and said means for recovering energy comprise a compression wave charger.

* * * * *